United States Patent Office 3,215,546
Patented Nov. 2, 1965

3,215,546
REFRACTORY PRACTICES
Albert Brent Wilson and Ernest Paul Weaver, Pittsburgh, Pa., assignors to Harbison-Walker Refractories Company, Pittsburgh, Pa., a corporation of Pennsylvania
No Drawing. Filed May 13, 1963, Ser. No. 280,136
3 Claims. (Cl. 106—56)

This invention relates to refractories, and especially to those useful in lining vessels for the production of steel by the oxygen blowing processes. In a particular aspect, the invention relates to method of providing tar bonded basic refractory shapes with a higher residual carbon content than heretofore possible.

Variants of the oxygen blowing process, which was first developed about ten years ago, have been referred to as the LD process, the Kaldo process, the rotor process, and the oxygen converter process. A basic slag is used, requiring the use of basic refractories to resist corrosion. Since the advent of these processes, continuous experimentation has produced refractories giving longer service life. The principal basic refractories of industry include products of dead burned magnesite or magnesia (MgO) or dead burned dolomite (CaO·MgO). Refractories made of lime (CaO) have also been proposed because of the extreme refractoriness of lime, but the tendency of lime to hydrate upon exposure to the moisture of the air has limited its use.

Research has been constant to develop a better refractory for the lining of the converter-like vessel used in this process. In the majority of operations where steel is made by the oxygen converter process, unburned brick of dead burned dolomite compositions bonded with a pitch or tar form at least a part of the lining material which contacts the melt. As is well known in the art, dead burned dolomite hydrates quite readily in the presence of moisture. The pitch or tar serves at least two functions: (1) provides a bond for the refractory particles, and (2) aids in inhibiting the hydration of the dead burned dolomite by forming a moisture-resistant coating on the grains. To further improve the hydration resistance of these bricks, blends of dead burned dolomite and magnesia have been used as have blends of dead burned stabilized dolomite with unstabilized dolomite.

The tar or pitch contributes still another feature to the refractory body; that is, the ability to better resist the chemical attack of the slag present in the vessel during the steelmaking process. Experience has shown that when brick, which are bonded with tar or pitch or other non-aqueous, cokable, carbonaceous material, are heated in service, these bonding materials are decomposed and carbon is deposited within the pores and around the grains of the refractory material. Laboratory studies and service experience in the oxygen converter have shown the value of increased carbon content in the lining material.

Production experience with such refractories has shown that satisfactory brick can be made using about 3 to 8% of the bonding material, such as pitch. With less than about 3% of tar or pitch, the mix will not flow sufficiently to give the desired density on forming. With more than about 8% of the bond, the batch becomes sticky and cannot be formed economically. Heretofore, carbon retention on heating has been essentially a direct function of the amount of pitch used as a bonding agent. The fact that about 8% of pitch is the upper limit that can be used due to forming problems also effectively has limited the quantity of retained carbon that it has been possible to produce in a refractory.

In United States Patent No. 3,070,449, issued Christmas day of 1962, and owned by the same assignee as the instant invention, Ernest P. Weaver and Ben Davies disclosed and claimed a method whereby residual or retained carbon could be greatly increased in basic refractories. In commercial exploitation of the invention of Patent No. 3,070,449, it has been common that residual carbon be increased by 50% and more.

While the increased retained carbon content possible by the teachings of United States Patent No. 3,070,449 is quite good, even higher levels of carbon retention in tar bonded basic refractories are to be desired. Accordingly, it is an object of this invention to provide a method whereby higher residual carbon can be provided in refractories than has been possible heretofore. It is another object of the invention to provide refractories which contain at least one material of the group magnesia, dolomite and lime bonded by nonaqueous, cokable, carbonaceous material such as tar or pitch, and having a higher residual carbon content than refractories of this nature produced heretofore.

We have discovered, and it is on this discovery that the instant invention is in large part predicated, that the foregoing objects can be attained readily by using a carbonized, basic refractory aggregate in at least the fine or —65 mesh fraction of a batch. An exemplary batch would be about 60% —4+65 mesh dead burned magnesite of the type manufactured according to United States Patent No. 3,060,000, owned by the same assignee as the instant invention. The —65 mesh fraction of the batch is precarbonized material. This latter material is obtained by procedures described in detail hereafter. To the dead burned magnesite and precarbonized materials batch, a carbonaceous bonding material is added. This bonding material is preferably a mixture of liquified, carbonaceous bonding agent (3 to 8%, by weight) and solid powdered, i.e. comminuted hard pitch (2 to 12%, by weight) having a softening point higher than the bonding agent. Such a bonding mixture is disclosed and claimed in United States Patent No. 3,070,449. It can alternatively be form 3 to about 8%, by weight, liquid bonding agent.

The foregoing batch is used to make brick in substantially the same manner discussed in United States Patent No. 3,070,449. These bricks, in comparative tests for carbon retention, in many instances showed a carbon retention increase over the brick of the patent by a factor of over 2.

The carbonized grain of this invention can be characterized as comprised of discrete particles or agglomerates of dense, dead burned, basic refractory material substantially entirely covered by an envelope of coke material. The refractory material is selected from the group, dead burned magnesite, dead burned dolomite, lime and mixtures thereof. The lime content of a mixture is preferably less than 50%. This coke firmly adheres to the particles and agglomerates, and penetrates within the pores thereof. This coke material is not easily removed from the grain, except by abrasive grinding or the like.

Preferably, the coke envelope is formed in situ on the refractory particles. An example of a preferred manner of fabricating this carbonized grain is as follows: Dead burned magnesite, made according to the teachings of United States Patent No. 3,060,000 (owned by the same assignee as the instant invention), is size graded to provide a brickmaking batch. This sizing can be: —4 on 10 mesh—about 40%, —10 on 28 mesh—about 30%, —28+65 mesh—about 10%, the rest passing a 65 mesh screen. This grain is mixed with 8%, by weight, liquid tar at a temperature of about 250 to 350° F.; and formed into shapes on a hydraulic press at 8000 p.s.i., while the tar is still fluid or plastic. The resulting shapes are heated in a furnace to a temperature between 1000 and 2000° F. in a non-oxidizing atmosphere. This temperature is maintained until the coke material forms and firmly adheres to the refractory grain and substantially all volatiles are driven off.

While, ideally, all the volatiles will be driven off from the tar material, very satisfactory material results when some of the volatiles remain. The essential feature here is that the coke material firmly adheres to particulate refractory material, including pore penetration. One satisfactory batch of grain was made from bats in which only about 50% of a given bat was completely cokified. In fact, one end of the bat had substantially no carbon left because it has come in contact with an oxidizing atmosphere, and the other end had 1% or less of volatiles. Thus, when we use the terms "carbonized grain" or "precarbonized grain" herein, we mean, generally, grain which includes a substantial and appreciable amount of coke material which has been deposited and formed in situ. By substantial and appreciable, we mean not negligible. As mentioned above, ideally, substantially all of the carbonaceous material of the carbonized grain will be in the form of coke; but any amount of coked material, formed in situ on the grain used in the fine fraction of brick made according to this invention provides improved results.

*Example I*

A ramming mix batch is manufactured consisting essentially of precarbonized grain having the following screen analysis:

| | Percent |
|---|---|
| −4 on 10 mesh | About 40 |
| −10 on 28 mesh | About 30 |
| −28 on 65 mesh | About 10 |
| Ball mill fines | About 20 |

By ball mill fines, we mean all passing a 65 mesh screen, and over 60% of the −65 mesh fraction passing a 100 mesh screen. A carbonaceous bonding agent (creosote) and about 3 parts of powdered hard pitch (both based on the total dry solids in the batch) is added to the size graded precarbonized grain batch. Shapes are formed as on a hydraulic press at about 3000 p.s.i. The cold crushing strength of the resulting shapes is on the order of 850 p.s.i. And these shapes have a density averaging about 170 p.c.f. The carbon retention after heating the shapes to 2200° F. in a nitrogen atmosphere increases over 2%, by weight, as compared to the best carbon retention of prior art comparative samples.

*Example II*

A refractory batch is prepared having the same composition and grain sizing as set forth in Example I. The carbonaceous bonding material is comprised of 6.5% of medium pitch. The batch is made into brick on a power press at about 8000 p.s.i. The modulus of rupture at room temperature is in excess of 1700 p.s.i. Comparative prior brick, not having the benefit of our precarbonized grain, only had about a 1500 p.s.i. modulus of rupture at room temperature.

In a carbon retention test similar in all respects to that described under Example I, there is shown an improvement by a factor of over 2, i.e. from about 1.7 to 2, for prior brick to about 4.7 for the brick of this invention. Also, note the improvement over such as Example 9 of Table I of Patent 3,070,449.

*Example III*

A batch was prepared consisting of about 60 parts of carbonized grain, identical to that discussed under Example I, and about 40 parts of dead burned magnesite of the type made according to the teachings of United States Patent No. 3,060,000. The carbonized grain was all +28 mesh with about 50% thereof being −4+10 mesh. The magnesite all passed a 28 mesh screen, and its overall sizing was such as to obtain the same total batch sizing as set forth under Example I. Shapes were formed from this batch in the same manner as shapes were formed from the batch of Example I. In the cold crushing test, these shapes disintegrated at 390 p.s.i. This established that the carbonized grain was necessary in the fines in order to have good strength.

*Example IV*

The same materials as discussed under Example III were used. The carbonized grain was equivalent to 40% of the batch and was all −28 mesh. Magnesite constitutes 60% of the batch and was all +28 mesh. The overall sizing of the batch was the same as given in Example I. This batch was made into shapes using the same techniques as discussed under Example I. Cold crushing strength of the resulting shapes was 610 p.s.i. This established the premise set forth under Example III, i.e. that the carbonized grain is necessary in the fine fraction of the batch to obtain acceptable strength.

*Example V*

A batch the same as set forth under Example II, except size graded commercial grade dead burned dolomite is used as the +28 mesh fraction of the batch.

*Example VI*

The same as Example I, except the refractory used to make the carbonized grain is material selected from the group dead burned dolomite, dead burned magnesite, and lime; but in which the total CaO content does not exceed about 50% of the batch.

*Example VII*

Any of the batches of the other examples, further including chrome ore, olivine, forsterite, or like basic refractory materials, and mixtures thereof, in which the total MgO+CaO content is at least about 50%, by weight. This 50% lower limit for CaO and MgO, in essence, means the other materials will not constitute more than about 30% of the total batch. These batches would be suitable for less critical, non-molten metal-contacting environments.

If they otherwise meet the requirements of the invention, bats from service installations may be used as a source of the precarbonized grain.

In the examples given above, the following are typical characteristics of the pitches used: For the medium pitch, the softening point (cube in water), 150° to 155° F.; free carbon ($CS_2$ method), 14.7 weight percent; distillation characteristics (ASTM D–246): 0–300° C., 0%: 0–315° C., 0%: 0–335° C., 0%: 0–355° C., 9.7%; coking value (Conradson method), 39.6 weight percent. For the hard pitch, the values are: softening point (cube in water), 305° F.; free carbon (insoluble in benzol), 40 weight percent; distillation characteristics (ASTM D–246): 0–300° C., 0%: 0–315° C., 0%: 0–335° C., 0%: 0–355° C., 0.1%; coking value (Conradson method) 52.4 weight percent. In the broadest aspect of the invention when we use terms referring to nonaqueous carbonaceous bonding agents we intend to include the art recognized group cokable tar and pitch, and creosote.

Having thus described the invention in detail and with sufficient particularity as to enable those skilled in the art to practice it, what is desired to have protected by Letters Patent is set forth in the following claims.

We claim:

1. A tar bonded refractory brick consisting of brickmaking size graded refractory grain and a tar bonding agent, from 20 to 100 parts, by weight, of the grain being precarbonized refractory particles, the refractory of the precarbonized particles being basic refractory selected from the group consisting of dense, dead burned magnesite, dolomite and lime having a preformed cokified envelope thereabout, the remainder of the grain in the brick being:
 (a) material selected from the group consisting of dense, dead burned magnesite, dolomite, and lime; and,
 (b) 0 to 30% of basic refractory material selected from the group consisting of chrome ore, olivine, forsterite, the total MgO plus CaO content of the brick, on an oxide basis, being at least 50%, by weight, at least 20 parts, by weight of the refractory in the brick being in the form of −65 mesh precarbonized particles.

2. A tar bonded refractory brick according to claim 1 in which all of the refractory grain is in the form of precarbonized particles.

3. A tar bonded refractory brick consisting of two types of refractory brickmaking size graded grain and a tar bonding agent, a first type of grain being precarbonized refractory particles, the refractory of the precarbonized particles being basic refractory selected from the group consisting of dense, dead burned magnesite, dolomite and lime having a preformed cokified envelope thereabout, a second type of grain being material selected from the group consisting of dense, dead burned magnesite, dolomite, and lime, at least 20 parts, by weight of the refractory in the brick being in the form of −65 mesh precarbonized particles.

References Cited by the Examiner
UNITED STATES PATENTS 3,070,449  12/62  Davies et al. _____ 106—56
3,111,415  11/63  Metz _____ 106—58

TOBIAS E. LEVOW, *Primary Examiner.*